United States Patent [19]

Whitaker et al.

[11] Patent Number: 4,461,984

[45] Date of Patent: Jul. 24, 1984

[54] LINEAR MOTOR SHUTTLING SYSTEM

[75] Inventors: C. Gordon Whitaker, Mercer Island; James H. Safford, Woodinville, both of Wash.

[73] Assignee: Mannesmann Tally Corporation, Kent, Wash.

[21] Appl. No.: 373,802

[22] Filed: May 3, 1982

[51] Int. Cl.[3] .............................................. G05B 11/00

[52] U.S. Cl. .................................... 318/687; 318/135; 318/640; 400/903; 400/314.1

[58] Field of Search ............... 318/638, 640, 652, 686, 318/687, 127, 128, 135, 313, 317; 400/903, 314.1, 315, 317, 322

[56] References Cited

U.S. PATENT DOCUMENTS

| | | | |
|---|---|---|---|
| 1,672,807 | 6/1928 | Etzel . | |
| 3,376,578 | 4/1968 | Sawyer | 346/29 |
| 3,486,094 | 12/1969 | Zane | 318/128 |
| 3,625,142 | 12/1971 | Bresler | 101/93 C |
| 3,696,204 | 10/1972 | Wallskog | 178/27 |
| 3,872,333 | 3/1975 | Imbert et al. | 310/27 |
| 3,911,814 | 10/1975 | Helms et al. | 101/93.16 |
| 3,917,987 | 11/1975 | Inoue | 318/135 |
| 4,012,676 | 3/1977 | Giebler | 318/687 X |
| 4,169,234 | 9/1979 | Yonkers | 310/29 |
| 4,180,766 | 12/1979 | Matula | 318/128 |
| 4,292,576 | 9/1981 | Watts | 318/640 |
| 4,325,016 | 4/1982 | Takeuchi | 318/640 |
| 4,359,289 | 11/1982 | Barrus et al. | 318/135 X |
| 4,368,413 | 1/1983 | Tazaki | 318/640 X |

OTHER PUBLICATIONS

Optimizing the Performance of an Electromechanical Print Mechanism, Everett M. Bailey et al., Hewlett-Packard Journal, vol. 29, No. 15, Nov. of 1978, pp. 23-32.

*Primary Examiner*—B. Dobeck
*Attorney, Agent, or Firm*—Christensen, O'Connor, Johnson & Kindness

[57] ABSTRACT

A linear motor shuttling system for shuttling the print head (11) of a dot matrix line printer is disclosed. The print head (11) is supported by a pair of flexures (13, 15) such that the head is free to move back and forth along a print line. One end of the flexure supported print head is attached to the coil (31) of a voice coil linear motor (23). The linear motor (23) is also flexure (27, 29) supported. The linear motor (23) is positioned such that the axis of coil movement is co-axial with the axis of movement of the print head (11). Further, the resonant vibration frequency of the combination of the linear motor and the linear motor flexure support is tuned to the resonant vibration frequency of the combination of the print head and the print head flexure support. A position sensor (51), preferably in the form of a pair of windows (W1, W2) connected to the print head (11) to move therewith and control the light impinging on a pair of differentially connected photovoltaic cells (A, B), produces a signal denoting the actual position of the print head. The actual position signal is compared with a commanded position signal in a control loop and the resultant error signal is used to control the magnitude and polarity of the current applied to the coil of the linear motor and, thus, the position of the print head. The signals produced by the photovoltaic cells (A, B) are also used to control the intensity of the light impinging on the cells so that the sum of the photovoltaic cell signal is a constant.

16 Claims, 4 Drawing Figures

LINEAR MOTOR SHUTTLING SYSTEM

TECHNICAL AREA

This invention relates to carriage shuttling mechanisms and, in particular, linear motor shuttling systems suitable for shuttling the print head of a dot matrix line printer at a controlled velocity.

BACKGROUND OF THE INVENTION

Various types of dot matrix line printers have been proposed and are in use. In general, dot matrix line printers include a print head comprising a plurality of dot printing mechanisms, each including a dot forming element. The dot forming elements are located along a line that lies orthogonal to the direction of paper movement through the printer. Since paper movement is normally vertical, the dot forming elements usually lie along a horizontal line. Located on the side of the paper remote from the dot forming elements is a platen and located between the dot forming elements and the paper is a ribbon. During printing, the dot forming elements are actuated to create one or more dots along the print line defined by the dot forming elements. The paper is incremented forwardly after each dot row is printed. A series of dot rows creates a row of characters.

While the present invention was developed to shuttle the print head of a dot matrix line printer and, thus, is expected to find its primary use in such printers, it is to be understood that the invention can be used to shuttle the carriages of other mechanisms requiring or desiring precise, controlled velocity shuttle motion.

In general dot matrix line printers fall into two categories. In the first category are dot matrix line printers wherein only the dot forming elements are shuttled. In the second category are dot matrix line printers wherein the entire print head, e.g., the actuating mechanisms as well as the dot forming elements, are shuttled. Regardless of the type, the portions of the dot printing mechanisms to be shuttled are mounted on a carriage and the carriage is moved back and forth (e.g., shuttled) by a shuttling mechanism. The present invention is useful with both categories of dot matrix printers. More specifically, while the invention was developed for use in connection with a dot matrix line printer wherein the entire print head is shuttled, the invention can also be utilized with dot matrix line printers wherein only the dot forming elements are shuttled.

In the past, various types of carriage shuttling mechanisms have been proposed for use in dot matrix line printers. One such type of carriage shuttling mechanism includes a stepping motor that is connected to the carriage so as to cause step increments of carriage movement. At the end of each step, the appropriate actuating mechanisms are energized to create dots. Bidirectional printing is provided by stepping the carriage first in one direction and then in the opposite direction. A major disadvantage resulting from the use of stepping motors in dot matrix line printers, particularly dot matrix line printers wherein the actuating mechanisms as well as the dot forming elements are shuttled, is that conventionally sized stepping motors have insufficient power to move the print head of such dot matrix line printers. That is, while conventionally sized stepping motors have adequate power to shuttle only the dot forming elements, they are marginal at best in printers wherein the entire print head is shuttled. In addition, stepping motors have a speed limitation that makes them undesirable for use in relatively high speed dot matrix line printers, e.g., 600 and above lines per minute (lpm) dot matrix line printers.

As a result of the inherent limitations of stepper motor shuttle systems, attempts have been made to utilize constant speed AC and DC motors to shuttle the print head of dot matrix line printers. One of the major disadvantages of constant speed motor shuttling systems resides in the coupling mechanisms used to couple the motors to the print head. In most instances, the coupling medium is a cam and cam follower mechanism. Cam/cam follower mechanisms are undesirable in a dot matrix line printer shuttle system because they are subject to a high degree of mechanical wear. More specifically, dot matrix line printers, particularly high speed dot matrix line printers, require precision positioning of the printer head at the time the dot forming elements are actuated by their related actuating mechanisms. Mechanical wear is highly undesirable because it reduces the precision with which the print head can be positioned. As print head positioning precision drops, dot misregistration increases. As a result, printed characters and images are distorted and/or blurred. Distorted and/or blurred images are, of course, unacceptable in environments where high quality printing is required or desired. More specifically, in order to produce high quality printing, it is necessary for a dot matrix line printer to be able to precisely position dots at the same position in each dot line. If this result cannot be accomplished, the resulting images and characters are blurred and/or distorted.

Another disadvantage of many prior art carriage shuttling systems that include constant speed motors and cam/cam follower coupling mechanisms is that the displacement versus time curve that they produce is nonlinear. As a result, relatively sophisticated carriage position sensing and control sytems are required if precise dot positioning is to be achieved.

In order to avoid the mechanical wear factor and nonlinear carriage displacement versus time curve produced by prior systems for mechanically coupling a constant speed motor to the print head of a dot matrix line printer, a proposal has been made to use a coupling system that includes a pair of elliptical pulleys. See U.S. Pat. No. 4,387,642, entitled "Bi-Directional, Constant Velocity, Carriage Shuttling Mechanism" by Edward D. Bringhurst et al. While the bi-lobed, second order eliptical gear coupling mechanism described in this patent application has certain advantages over prior coupling mechanisms, it also has certain disadvantages. For example, it is undesirably noisy, mechanically complex and more expensive to manufacture than desirable.

In addition to stepping motor systems and constant speed motor systems, in the past, proposals have been made to use linear motors to shuttle the carriages of printer mechanisms. A linear motor is a motor wherein the axis of movement of the movable element of the motor is rectilinear rather than rotary. One such proposal is described in U.S. Pat. No. 3,911,814, entitled "Hammer Bank Move Control System" by Clifford J. Helms, et al. This patent describes a hammer bank system wherein the hammer bank is moved back and forth between two positions. In one position the hammers are aligned with odd character positions and in the other the hammer bank is aligned with even character positions. In response to control signals, the hammer bank is actuated to imprint a character when the appropriate character type is aligned with the hammer. In other words, this mechanism is directed for use in a character printer, as opposed to a dot matrix printer. Obviously, a character printer does not have the precise printer head positioning requirement of a dot matrix line printer.

One proposal to utilize a linear motor in a dot matrix line printer is described in U.S. Pat. No. 4,180,766, entitled "Reciprocating Linear Drive Mechanism" by Jerry Matula. In the system described in this patent, a reciprocable drive mechanism supporting the hammer bank is mounted to undergo free flights with low friction along a selected axis parallel to a printing line. At each limit of movement the drive mechanism encounters a resilient stop member which reverses the direction of motion of the drive mechanism and the hammer bank. Losses occurring during a reversal are compensated for by an energy impulse from a coupled linear electromagnetic drive and an associated velocity servo system, which eliminates the need for close servo control during reversal, allowing the drive mechanism to rebound naturally. During reversal, the velocity servo system, which is driven into saturation, senses the occurrance of zero motion of the drive mechanism and reverses the direction of energization of the electromagnetic drive. Hammer bank velocity during movement through a print span is sensed, and further kinetic energy is supplied by the servo system as required to compensate for friction losses, braking effects during printing, and other causes of variations in hammer bank speed.

There are a number of disadvantages to the reciprocating linear drive mechanism described in U.S. Pat. No. 4,180,766. For example, the use of a low power motor, primarily designed to overcome friction and printing loads, results in a system that has slow turnaround time, whereby overall printer speed is low. This undesirable result is enhanced by the use of a rebound system, as opposed to an energy storage system to improve turnaround time. Also, mechanism of the type described lin U.S. Pat. No. 4,180,766 consume several shuttle cycles before shuttle speed is raised to the desired printing speed. In other words, print start up time is high, which is particularly disadvantageous in printers that are operated in an intermittent manner.

A further example of a dot matrix line printer where a print head is reciprocated by a linear motor is the Model 2608A Line Printer produced by the Hewlett-Packard Company, Palo Alto, Calif. In this printer both the print head and the linear motor are supported by flexures. One disadvantage of this printer is an undesirably high level of vibration due to the difference in resonant vibration frequencies between the flexure supported print head mechanism and the flexure supported linear motor mechanism.

SUMMARY OF THE INVENTION

In accordance with this invention a linear motor shuttle system that is particularly suitable for use in shutting the print head of a dot matrix line printer is provided. The print head is supported by a pair of flexures such that the head is free to move back and forth along a print line. As the print head is moved in one direction or the other the flexures store energy, which is utilized to decrease turnaround time at the end of the stroke in the movement direction. One end of the print head is attached to the movable element of a linear motor. The linear motor is flexure mounted and positioned such that the axis of movement is aligned (preferably coaxially aligned) with the axis of movement of the print head. Further, the resonant vibration frequency of the combination of the linear motor and the linear motor flexure support is tuned to the resonant vibration frequency of the combination of the print head and the print head flexure support. A position sensor continuously senses the position of the print head and produces an actual position signal related thereto. The actual position signals are compared with commanded position signals and the resultant error signals are used to control the magnitude and polarity of the current applied to the linear motor and, thus, the position of the print head.

In accordance with further aspects of this invention the linear motor is a voice coil linear motor whose coil is directly coupled to the print head.

In accordance with other aspects of this invention, the position sensor includes a pair of differentially connected light detecting cells (perferably, photovoltaic cells) and a pair of windows connected to the print head. The windows control the amount of light received by the cells such that, starting from a center null position, as the signal produced by one cell increases, the signal produced by the other correspondingly decreases. As a result the differential combination of the signals precisely defines the position of the print head from the center or null position.

In order to reduce power requirements, preferably, the spring constant of the flexures supporting the print head is chosen such that the resonant frequency of the print head is at or near the operating speed of the shuttle system.

In accordance with yet other aspects of this invention, the commanded position signal is an analog signal produced by a sweep controller under the control of a master controller. A sweep comparator compares the output of the sweep controller with the signal produced by the sensor and the output of the sweep comparator controls the linear motor via a switching amplifier. Preferably, the master controller produces digital control signals and the sweep controller converts the digital control signals into analog form. Further, preferably, the master controller produces a SWEEP PROFILE SELECT signal that is used by the sweep controller to control the sweep profile followed by the print head. Most preferably, the sweep controller includes a counter that counts pulses produced by the master controller. The master controller controls the frequency of the pulses counted by the counter and, thus, ultimately the frequency of the shuttle motion. The sweep controller also includes a latch that receives and stores the SWEEP PROFILE SELECT signal. The output of the latch in combination with the output of the counter form an ADDRESS signal, which is applied to a read only memory (ROM). In accordance therewith, the ROM produces a digital signal that defines commanded position. The output of the ROM is converted from digital form to analog form in a digital-to-analog (D/A) converter and the analog signal is applied to the sweep comparator wherein it is compared with the actual position signal produced by the sensor. Further, preferably, the switching amplifier includes a pulse width modulator and a bridge circuit whose legs are formed of four switches. The coil of the linear motor is connected across one of the pair of opposing terminals of the bridge and a power source is connected across the other pair of opposing terminals. The pulse width modulator controls the state of four switches forming the legs of the bridge circuit and thereby controls the polarity and magnitude of the current flowing through the coil of the linear motor.

As will be readily appreciated from the foregoing description, the invention provides a linear motor shuttle system suitable for shuttling the print head of a dot matrix line printer. Because the print head is supported by energy storing flexures, the linear motor shuttle system of the invention has a faster turnaround time than a shuttle system of the type described in U.S. Pat. No. 4,180,766, referenced above. Further, the use of flexures to support both the print head and the linear motor and tuning the resultant combinations results in a low vibration system, even when the print head is shuttled at the relatively high speed required by 600 lpm and above printers. That is, tuning the print head/flexure and linear motor/flexure combinations results in a mechanism that is vibration balanced. Also, the use of a pair of simple, albeit precise, light detecting elements to produce an actual position signal and combining the thusly produced actual signal with a digitally derived commanded position signal to produce an error signal results in a highly precise, yet uncomplicated, control system.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
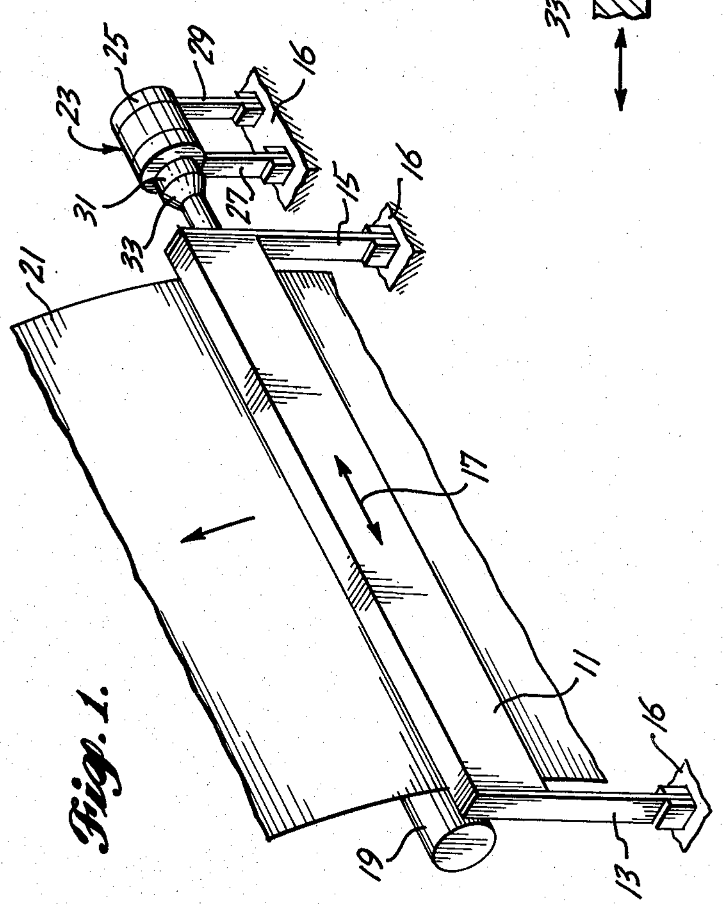
FIG. 1 is a pictorial diagram illustrating the mounting and positioning of a print head and the mechanical components of a linear motor shuttling system formed in accordance with the invention.

FIG. 1 is a pictorial diagram illustrating the print head 11 of a dot matrix line printer supported by a pair of flexures 13 and 15. Since the print head 11 does not form a portion of this invention, it is illustrated in schematic form. By way of example, the print head 11 may take the form of the the print head described in U.S. Pat. No. 4,351,235, entitled "Dot Printing Mechanism For Dot Matrix Line Printers" filed Sept. 11, 1980 by Edward D. Bringhurst. Preferably, the print head flexures 13 and 15 are formed of elongate pieces of flat spring steel having one end attached to the frame 16 of the printer. The flexures 13 and 15 are aligned with one another and lie in parallel planes separately by the length of the print head 11.

The print head 11 is mounted between the movable ends of the flexures 13 and 15 so as to be rectilinearly movable in the direction of an arrow 17. The arrow 17 lies parallel to the longitudinal axis of the print head and orthogonal to the parallel planes in which the flexures 13 and 15 lie.

As will be readily appreciated by those familiar with dot matrix line printers, particularly after reviewing U.S. Pat. No. 4,351,235 referenced above, the length of the print head is substantially equal to the width of the maximum size of the paper 21 acceptable by the dot matrix printer of which it forms a part. For example, the print head may include sixty-six (66) separate dot printing mechanisms each of which is designed to scan or cover two character positions. The total or maximum character line width of such a printer is one hundred and thirty-two (132) characters. Since the number of character positions to be scanned (two) is small compared to the number of printing mechanisms (sixty-six), obviously, the shuttle distance is small when compared to the length of the print head.

For orientation purposes, a platen 19 is illustrated in FIG. 1 as lying parallel to the print head 11 on the other side of the paper 21 from the print head. While not shown in FIG. 1, obviously, a suitable ink source (i.e., a ribbon) must be located between the print head 11 and the paper 21. The print head flexures 13 and 15 are located adjacent to the edge of the paper 21.

Located at one end of the print head 11, beyond the nearest print head flexure 15, is a voice coil linear motor 23. The housing 25 of the voice coil linear motor 23 is supported by a pair of motor flexures 27 and 29. One end of the motor flexures 27 and 29 are attached to the frame 16 of the printer. The other ends of the motor flexures 27 and 29 support the housing 25 of the voice coil linear motor. The motor flexures are preferably formed of flat pieces of spring steel lying in parallel planes, which are also parallel to the planes in which the print head flexures lie.

The voice coil linear motor is positioned such that the rectilinear axis of motion of the coil 31 of the motor 23 is coaxial with the longitudinal axis of the print head 11. The coil 31 of the voice coil linear motor 23 is connected to the adjacent end of the print head 11 by an arm or bracket 33. Thus, as the coil 31 of the voice coil linear motor 23 is oscillated back and forth in the manner hereinafter described, the print head 11 is shuttled back and forth in the direction of the arrow 17. As will be readily apparent to those skilled in the dot matrix line printer art, such printers can be used as both character and plotting printers. A printer formed in accordance with the invention can function in either mode of operation. When in the character mode, coil movement distance is slightly greater than the width of the number (e.g., two) of character positions to be scanned by the print head.

Figure 2:
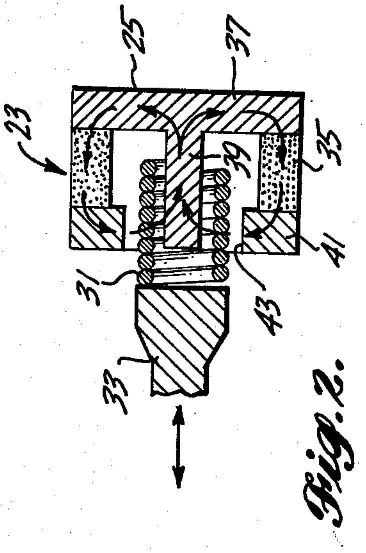
FIG. 2 is a cross-sectional view of the linear motor illustrated in FIG. 1.

As shown schematically in FIG. 2, the coil 31 of a voice coil linear motor 23 is positioned so as to be movable in and out of the housing 25 of the motor. The housing 25 includes a permanent magnet 35, which is preferably cylindrical in shape. One end of the cylindrical permanent magnet is enclosed by a magnetically permeable (i.e., ferromagnetic) plate 37 having a center stud 39. The coil 31 is sized so as to surround the stud 39. The other end of the cylindrical permanent magnet 35 is enclosed by a magnetically permeable plate 41 having a central aperture 43 through which the coil 31 passes. Thus this plate 41 is in the form of a collar that surrounds the coil 31. The magnetic flux produced by the cylindrical permanent magnet 35 flows in the paths depicted by the arrows in FIG. 2. This magnetic flux interacts with the magnetic flux produced by the coil when electric current flows in the coil 31 due to the application of electric power to the coil. Depending upon the direction of coil current flow, the flux interaction is such that the coil 31 is either retracted into the housing 25 or repelled from the housing. Hence, the instantaneous direction of current flow controls the instantaneous direction of movement of the coil and, thus, the instantaneous direction of moement of the print head 11. The magnitude of the current flow controls the magnitude of the coil retraction or repelling force.

The spring constants of the motor flexures 27 and 29 are chosen to vibration balance the linear motor shuttling system. In this regard, the resonant vibration frequency of the linear motor and its flexure support system is tuned to the resonant vibration frequency of the carriage and its flexure support system. Further, this resonant frequency is at or near the shuttling speed. As a result, shuttling power requirements are maintained low.

Figure 3:
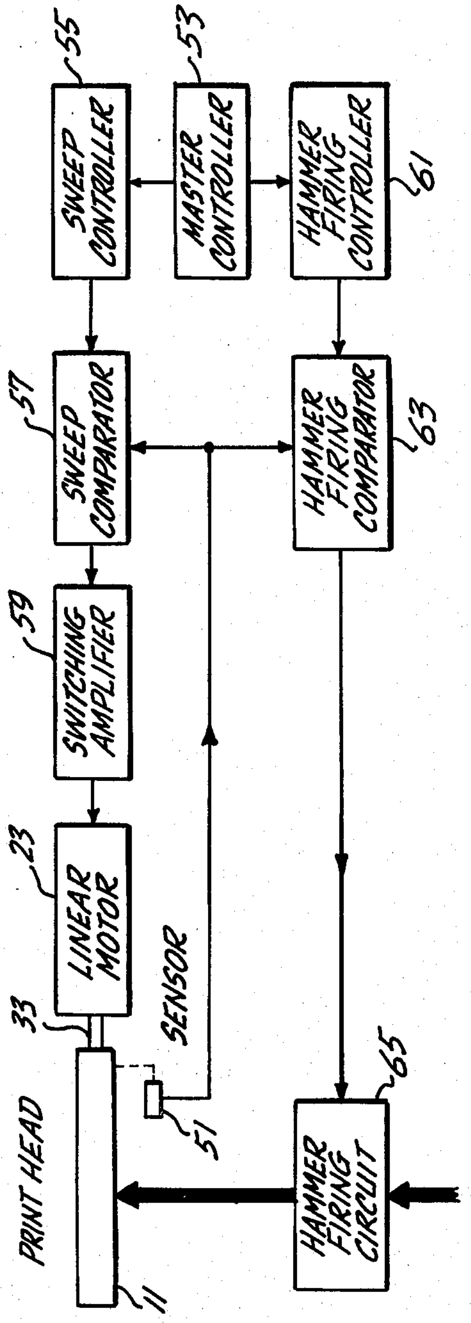
FIG. 3 is a block diagram of a preferred embodiment of a linear motor shuttling system formed in accordance with the invention; and, FIG. 4 is a more detailed block diagram of the electronic components of the preferred embodiment of the linear motor shuttling system illustrated in FIG. 3.

FIG. 3 is a block diagram illustrating a preferred embodiment of a linear motor shuttling system formed in accordance with the invention connected to the print head 11 of a dot matrix line printer. In addition to including (in block form) the print head 11, the linear motor 23 and the connecting arm or bracket 33 illustrated in FIG. 1 and described above, FIG. 3 also includes: a position sensor 51; a master controller 53; a sweep controller 55; a sweep comparator 57; a switching amplifier 59; a hammer firing controller 61; a hammer firing comparator 63; and, a hammer firing circuit 65.

As illustrated by a dashed line, the sensor 51 is coupled to the print head 11 to continuously detect or sense the position of the print head 11. Based on the detected or sensed information, the sensor 51 produces an actual position signal that is applied to one input of the sweep comparator 57 and to one input of the hammer firing comparator 63. The master controller 53 produces control signals that are applied to the second input of the sweep comparator 57 via the sweep controller 55 and to the second input of the hammer firing comparator 63 via the hammer firing controller 61. The output of the sweep comparator is connected to the control input of the switching amplifier 59. The switching amplifier is connected to the coil of the linear motor and controls the magnitude and direction of current flow therethrough. Thus, the output signal produced by the sweep comparator 57 controls the operation of the linear motor 23. The output of the hammer firing comparator 63 is connected to the hammer firing circuit 65 to control the timing of the firing of the print actuating mechanisms contained in the print head 11 and, thus, the timing of the printing action.

In operation, the master controller 53 produces control signals suitable for controlling both the position of the print head and the position of the print head at which the actuating mechanisms are to be fired to print dots. More specifically, the master controller 53 produces print head position control (i.e., commanded position) signals in digital form. The sweep controller 55 converts the digital signals into analog signals and applies the analog signals to the sweep comparator. The sweep comparator compares the analog signal produced by the sweep controller 55 (the commanded position signal) with the actual position signal produced by the sensor 51. In accordance therewith, the sweep comparator produces an error signal, which is applied to the switching amplifier 59. In accordance therewith, the switching amplifier 59 applies a current to the coil of the linear motor 23 whose magnitude and polarity causes the coil to move in a direction that moves the print head 11 to the commanded position. That is, the switching amplifier applies a correction current to the coil of the linear motor. Similarly, the hammer firing controller receives digital signals from the master controller that denote the position of the print head at which the hammers are to be fired. And, in accordance therewith, produces an analog signal. This analog signal goes through a lead circuit prior to being compared with the actual position signal in the hammer firing comparer 63. When the print head reaches the position at which the print actuating mechanisms are to be energized, the hammer firing comparator 63 produces a trigger pulse. The trigger pulse enables the hammer firing circuit 65 to apply actuating signals to the required actuating mechanisms. More specifically, in addition to the trigger pulse, the hammer firing circuit receives signals denoting which of the actuating mechanisms are to be energized when the position (defined by the position control signals produced by the master controller and converted by the hammer firing controller) is reached. Due to the lead circuit the trigger pulse occurs before the dot print position is reached. The lead time is chosen to equal the time it takes for the dot printing hammers to move from their rest position to their dot printing position. Which of the actuating mechanisms are to be fired is, of course, determined by the nature of the characters or image to be created. The determination of which actuating mechanisms are to be fixed or energized may be determined by the master controller or some other data source. Regardless of the source of the firing information, the related actuating mechanisms are not energized until the hammer firing comparator produces a trigger pulse. In summary, the hammer firing comparator produces a signal denoting only that the print head is at a position where the actuating mechanisms are to be fired—not which of the actuating mechanisms are to be fired.

Figure 4:
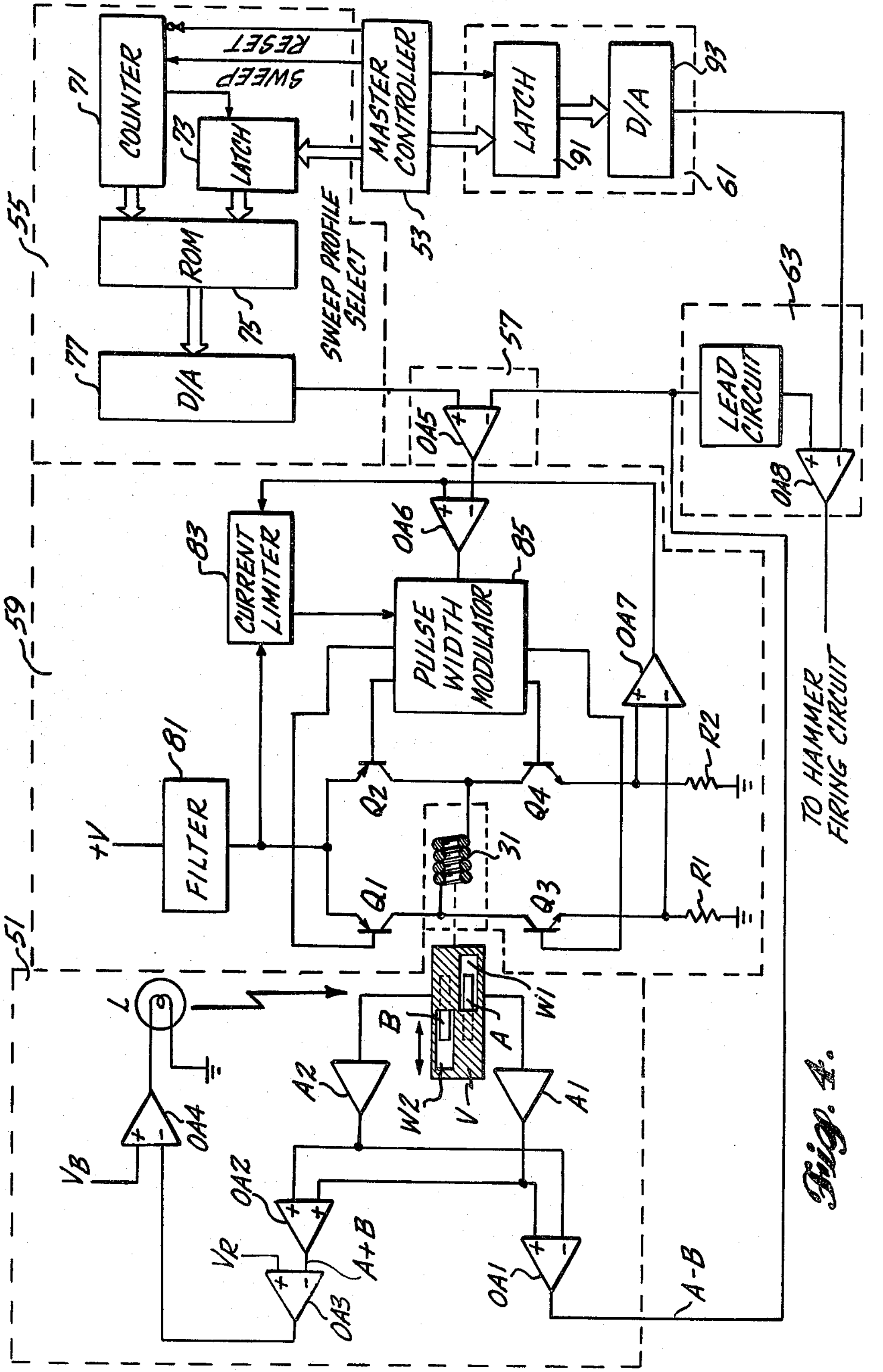

FIG. 4 is a detailed block and schematic diagram of the major components of the linear motor shuttling system illustrated in FIG. 3. As illustrated in FIG. 4, preferably, the sensor 51 includes: two signal amplifiers designated A1 and A2; four operational amplifiers designated OA1, OA2, OA3 and OA4; a light emitting diode (LED) designated L; two photovoltaic cells designated A and B; and, a vane designated V including two windows designated W1 and W2. The vane, V, is shown as connected to the coil 31 of the linear motor by a dashed line to indicate that the vane moves with the coil and, thus, the position of the vane tracks the position of the print head 11. The LED, L, vane, V, and photovoltaic cells, A and B, are all positioned such that light from the LED passes through the vane windows, W1 and W2, and impinges on the light detecting surfaces of the photovoltaic cells A and B. More specifically, the vane windows, W1 and W2, are positioned between the LED, L, and the photovoltaic cells A and B, such that one window, W1, controls the amount of light impinging on the light sensitive surface of one of the photovolatic cells, A, and the other window, W2, controls the amount of light impinging on the light sensitive surface of the other photovoltaic, B. The photovoltaic cells are elongate, of equal size, and lie parallel to one another, as illustrated in FIG. 4. The windows are also elongate, of equal size and lie parallel to one another. While the windows are of equal size only the length of the windows is the same as the length of the photovoltaic cells. The width of the windows is slightly greater than the width of the photovoltaic cells. Further, rather than being aligned side by side, as are the photovoltaic cells, the windows are offset from one another such that each window begins at the end of the other window and projects outwardly therefrom in the opposite longitudinal direction.

A1 and A2 are each connected to one of the photovoltaic cells, A and B. A1 and A2 amplify the signals produced by the photovoltaic cells to which they are connected. OA1 is a differential amplifier that produces an output voltage whose magnitude is related to the difference in the voltage of the signals applied to its inverting and noninverting inputs. The output of A1 is connected to the noninverting input of OA1 and the output of A2 is connected to the inverting input of OA1. As a result, the output of OA1 is, mathematically, equal to the magnitude of the voltage produced by photovoltaic cell A minus the magnitude of the voltage produced by photovoltaic cell B (denoted A-B in FIGURE A). The output of OA1 is connected to one input of the sweep comparator 57 and to one input of the hammer firing comparator 63.

OA2 is a summing amplifier that produces an output voltage whose magnitude is related to the sum of the voltages applied to two inputs, both of which are denoted as noninverting. OA3 and OA4 are differential amplifiers. The output of A1 is connected to one input of OA2 and the output of A2 is connected to the second input of OA2. The output of OA2 (denoted A+B in FIG. 4) is applied to the inverting input of OA3. A reference voltage, designated $V_R$, is applied to the noninverting input of OA3. Hence, OA3 forms a leveling amplifier that raises (or lowers) the output of OA2 to a suitable voltage level. The output of OA3 is connected to the inverting input of OA4. A bias voltage source, designated $V_B$, is connected to the noninverting input of OA4. The output of OA4 is connected through the lamp, L, to ground.

As will be readily appreciated by those skilled in the electronics art from the foregoing description, the circuit formed by OA2, OA3 and OA4 is an intensity control loop that controls the level of the illumination produced by L so that the output of OA2 always equals a constant. This control loop compensates for any variations in the level of illumination produced by the lamp and for gain variations that occur equally in both photovoltaic cells. In this regard, preferably, the two photovoltaic cells are identially formed, i.e., matched, so that most long term variations will be common, and, thus, cancellable by the action of the illumination control loop. Most preferably, matching is accomplished by creating both cells on the same wafer—by similarily doping two adjacent areas of a common wafer, for example.

The sweep controller 55 illustrated in FIG. 4 comprises: a counter 71; a latch 73; a read-only memory (ROM); and, a digital-to-analog (D/A) converter 77. The master controller 53 produces a plurality of output signals that are applied to the sweep controller 55. These control signals include RESET pulses, which are applied to the rest input of the counter 71; SWEEP pulses, which are applied to the pulse count input of the counter 71; and, a SWEEP PROFILE SELECT parallel digital signal, which is applied to the signal input of the latch 73. The read or latch control input of the latch 73 is connected to an output of one of the stages of the counter 71. The address inputs of the ROM 75 are connected to the parallel outputs of the stages of the counter 71 and to the output of the latch 73. The signal outputs of the ROM 75 are connected to the digital signal inputs of the D/A converter 77. The analog output of the D/A converter 77 is connected to an input of the sweep comparator 57 as illustrated in FIG. 3 and described above.

In operation, each time a RESET pulse occurs, the counter 71 is reset to an initial (e.g., zero) state. Thereafter, each time a SWEEP pulse is produced by the master controller 53 the counter 71 is incremented by one. The SWEEP PROFILE SELECT signal determines the sweep profile followed by the print head as it is moved by the action of the linear motor. More specifically, the master controller 53 produces SWEEP PROFILE SELECT signals that define the profile (e.g., triangular, sinusoidal, sawtooth, etc.) to be followed as the print head is swept back and forth. The SWEEP PROFILE SELECT signals are read into and stored in the latch 73 each time the appropriate stage of the counter 71 produces a pulse. The pulse produced by the counter 71 may, for example, occur when the counter is reset to zero. The SWEEP PROFILE SELECT signal stored in the latch, in combination with the counter stage output signals, form the address applied to the ROM 75 at any particular point in time. Since the counter 71 is incremented each time a SWEEP pulse is produced by the master controller 53 the ROM address changes at the rate SWEEP pulses are produced by the master controller. Thus, by controlling the rate of sweep pulses, the master controller in turn controls the rate of ROM address changes, which in turn, controls the rate of change of the ROM output signals. Consequently, both the print head sweep profile and the rate at which the sweep profile is followed are controlled by the master controller 53. In this regard, each time the ROM address changes it produces a different parallel digital output signal. The parallel digital output signals produced by the ROM are converted from digital form to analog form by the D/A converter 77. Thus, the signal applied to the SWEEP COMPARATOR 57 by the sweep controller is an analog signal whose shape and rate of change are determined by the address applied to the ROM 75, which address is controlled by the master controller 53.

The sweep comparator 57 comprises an operational amplifier designated OA5. The output of OA1 is applied to the inverting input of OA5 and the output of the D/A converter 77 of the sweep controller 55 is applied to the noninverting input of OA5. OA5 compares its two inputs in a conventional manner and produces a differential output signal in accordance therewith.

The switching amplifier 59 comprises: two operational amplifiers designated OA6 and OA7; a filter 81; a current limiter 83; a pulse width modulator 85; two PNP transistors designated Q1 and Q2; two NPN transistors designated Q3 and Q4; and, two resistors designated R1 and R2. A power source, designated +V, is connected through the filter 81 to the emitter terminals of Q1 and Q2 and to the power input of the current limiter 83. The collector of Q1 is connected to the collector of Q3 and the collector of Q2 is connected to the collector of Q4. The emitters of Q3 and Q4 are connected through R1 and R2, respectively, to ground. The junction between Q1 and Q3 is connected to one end of the coil 31 of the linear motor and the junction between Q2 and Q4 is connected to the other end of the coil. The output of OA5 is connected to the inverting input of OA6. The junction between the emitter of Q3 and R1 is connected to the inverting input of OA7 and the junction between the emitter of Q4 and R2 is connected to the noninverting input of OA7. The output of OA7 is connected to the noninverting input of OA6 and to the control input of the current limiter 83. The output of OA6 is connected to the control input of the pulse width modulator 85 and the output of the current limiter 83 is connected to the shutdown control input of the pulse width modulator. The pulse width modulator 85 produces four outputs, one of which is applied to the base of each of Q1, Q2, Q3 and Q4.

As will be readily appreciated from the foregoing description, Q1, Q2, Q3 and Q4 form the legs of a bridge circuit that controls the polarity of the current flow through the coil 31 of the voice coil motor. More specifically, Q1 and Q4, and Q2 and Q3, form pairs of switches that are always in opposite states (i.e., Q1 and Q4 are on when Q2 and Q3 are off and vice versa), unless all four transistors are off. When one pair of transistors, e.g., Q1 and Q4, are on current flows from +V, through the filter, through Q1, through the coil (in one direction), through Q4 and, finally, through R2 to ground. When the other pair of transistors, e.g., Q2 and Q3, are on current flows from +V, through the filter, through Q2, through the coil (in the opposite direction), through Q3 and, finally through R1 to ground.

The open/closed states of Q1, Q2, Q3 and Q4 are controlled by the high/low states of the outputs of the pulse width modulator 85. The high/low states of the outputs of the pulse width modulator are, in turn, controlled by the polarity of the output of OA6. When the output of OA6 is positive the outputs of the pulse width modulator 85 are such that one pair of transistors (Q1 and Q4 or Q2 and Q3) are turned on and the other pair is turned off. Contrariwise, when the output of OA6 is negative the outputs of the pulse width modulator are such that the other pair of transistors is turned on and the first pair is turned off.

Since the polarity of the output of OA6 is determined by whether the current feedback signal developed by OA7 (which is determined by the difference in the voltage drops across R1 and R2) is greater or less than the output of OA5, it is the relationship between these two voltages that determines the polarity of the current flow through the coil 31 of the linear motor. If the position error voltage occurring on the output of OA5 is above the voltage on the output of OA7, the current flow direction is such that the coil moves the vane in a direction that changes the A-B voltage value in a manner that raises the output of OA5. Contrariwise, if the position error voltage occurring on the output of OA5 is below the voltage on the output of OA7, the current flow direction is such that the coil moves the vane (and thus the print head) in a direction that changes the A-B voltage value in a manner that lowers the output of OA5.

In addition to controlling the direction of current flow through the coil 31 in the manner just described, the output of OA6 also controls the magnitude of the current flow. More specifically, the magnitude of the output of OA6 controls the width of the "turn on" pulses applied to the pair of transistors that are turned on. Since the width or on time of the transistor switches controls the magnitude of the power applied to the coil, the magnitude of the output of OA6 controls the magnitude of the power applied to the coil 31. The current limiter is provided to set a maximum value on the amount of power that can be applied to the coil to prevent the destruction of the coil and/or the transistor switches.

The hammer firing controller 61 comprises: a latch 91; and, a digital-to-analog (D/A) converter 93. The master controller 53 produces parallel digital signals that denote hammer firing positions. The digital signals are read and stored in the latch 91 each time a latch signal is produced by the master controller 53. The digital output of the latch 91 is applied to the digital input of the D/A converter 93 wherein it is converted from digital form to analog form. The analog form of the hammer firing position signals are applied to the second input of the hammer firing comparator 63.

The hammer firing comparator 63 includes: a lead circuit 95; and, an operational amplifier designated OA8. The A-B signals produced by the sensor 51 are applied through the lead circuit 95 to the noninverting input of OA8. The analog signals produced by the D/A converter of the hammer firing controller 61 are applied to the inverting input of OA8. OA8 differentially compares its two input signals and produces a different output signal, which is applied to the hammer firing circuit 65, illustrated in FIG. 3 and previously described. The lead circuit 95 is included in the actual position signal path to compensate for the flight time of the hammers. In essence, a time leading version of the actual hammer position signal is compared with a signal representing the desired hammer firing position. When the two signals are the same, the output of OA8 changes state and creates a hammer fire pulse that enables the hammer firing circuits 65.

As will be readily appreciated from the foregoing description, the invention provides a highly accurate linear motor shuttling system suitable for use in a dot matrix line printer to precisely control the shuttling of a print head and the firing of print actuating mechanisms. The invention uses a relatively stiff, tuned flexure system operating near its resonant frequency and a relatively strong voice coil linear motor to keep print head turnaround time low. Consequently, the invention is ideally suited for use in high speed dot matrix line printers. In this regard, preferably, the linear motor coil is reversed full on when the last dot position is reached. Full on energization of the linear motor in combination with the energy stored in the flexures results in extremely short turnaround times. In one actual embodiment of the invention, turnaround time is three (3) milliseconds. Moreover, rather than requiring that several cycles elapse before print head movement rose to operating speed, as is the case with systems of the type described in U.S. Pat. No. 4,180,766, in one actual embodiment of the invention print head movement rose to operating speed within one quarter ($\frac{1}{4}$) cycle.

While a preferred embodiment of the invention has been illustrated and described, it will be appreciated that various changes can be made therein without departing from the spirit and scope of the invention. Consequently, within the scope of the appended claims, the invention can be practiced othewise than as specifically described herein.

The embodiments of the invention in which an exclusive property or privilege is claimed are defined as follows:

1. A linear motor shuttling system suitable for rapidly shuttling a carriage over a short distance, said linear motor shuttling system comprising:

(A) first flexure means for supporting a carriage for rectilinear movement along an axis;

(B) a linear motor, said linear motor including a housing having magnetic means for producing a magnetic field and a coil positioned so as to produce a magnetic field that interacts with the magnetic field produced by said magnetic means when a current flows through said coil, said interaction causing said coil to move in one direction or the other along a linear axis depending upon the polarity and magnitude of current flow through said coil;

(C) second flexure means for supporting said housing of said linear motor such that said linear axis along which said coil moves lies in substantial alignment with the axis along which said carriage is supported for rectilinear movement by said first flexure means;

(D) coupling means for coupling said coil of said linear motor to said carriage such that said movement of said coil in one direction or the other along said linear axis causes said rectilinear movement of said carriage along said axis;

(E) power supply means for supplying power to the coil of said linear motor; and, (F) control means connected to said power supply means and the coil of said linear motor for controlling the polarity and magnitude of current flow through said coil, and, thus, the shuttling frequency of said rectilinear carriage movement, said control means including:

(1) position sensing means for continuously sensing the position of said carriage and producing an actual position signal related thereto;

(2) command signal generating means for continuously producing commanded position signals;

(3) comparison means for comparing said actual position signals with said commanded position signals and producing error signals related to the difference therebetween; and, (4) current flow control means connected to receive said error signals and control the polarity and magnitude of the current flow through said coil so as to reduce said error signals.

2. A linear motor shuttling system as claimed in claim 1 wherein said position sensing means includes: a light source; a pair of photocells positioned so as to receive light from said light source; and, a vane including a pair of windows mounted between said light source and said pair of photocells, said vane connected to said carriage such that movement of said carriage controls the position of said windows and, thus, controls the amount of light impinging on said photocells, said pair of photocells controlling the position information contained in said actual position signal.

3. A linear motor shuttling system as claimed in claim 2 wherein said photocells are similarly sized, elongate photovoltaic cells.

4. A linear motor shuttling system as claimed in claim 3 wherein said windows are elongate and similarly sized, and wherein said windows are offset from one another in their longitudinal direction.

5. A linear motor shuttling system as claimed in claim 4 wherein the longitudinal dimension of said elongate windows lies parallel to the longitudinal dimension of said elongate photovoltaic cells.

6. A linear motor shuttling system as claimed in claim 5 wherein said position sensing means also includes a differential comparator connected to said photovoltaic cells to produce an output signal related to the difference in the voltages produced by said photovoltaic cells, said difference signal forming said actual position signal.

7. A linear motor shuttling system as claimed in claim 6 wherein said position sensing means also includes a light control loop connected to the outputs of said photovoltaic cells and to said light source for maintaining the combined output of said photovoltaic cells at a constant level by controlling the amount of light produced by said light source.

8. A linear motor shuttling system as claimed in claim 2 wherein said position sensing means also includes a differential comparator connected to said photocells to produce an output signal related to the difference in the voltages produced by said photocells, said difference signal forming said actual position signal.

9. A linear motor shuttling system as claimed in claim 8 wherein said position sensing means also includes a light control loop connected to the outputs of said photocells and to said light source for maintaining the combined output of said photocells at a constant level by controlling the amount of light produced by said light source.

10. A linear motor shuttling system as claimed in claim 2 wherein said position sensing means also includes a light control loop connected to the outputs of said photocells and to said light source for maintaining the combined output of said photocells at a constant level by controlling the amount of light produced by said light source.

11. A linear motor shuttling system as claimed in claim 1 wherein the resonant vibration frequency of the combination of said linear motor and said second flexure means is tuned to the resonant vibration frequency of the combination of said carriage and said first flexure means.

12. A linear motor shuttling system as claimed in claim 11 wherein the spring constant of said first flexure means is chosen such that the resonant vibration frequency of the combination of said carriage and said first flexure means is substantially the same as said shuttling frequency.

13. A linear motor shuttling system as claimed in claim 1 wherein said current flow control means includes:

a bridge switching circuit, said bridge switching circuit including four switches, one mounted in each of the legs of said bridge switching circuit, said coil of said linear motor being connected across one set of opposing terminals of said bridge and said other set of opposing terminals of said bridge connected to said power supply means; and, a pulse width modulator that produces four output control signals, one applied to each of said switches to control the open/closed state thereof to thereby control the polarity and magnitude of the current flow through the coil of said linear motor.

14. A linear motor shuttling system as claimed in claim 1 wherein said command signal generating means comprises:

a master controller for producing: (i) SWEEP PROFILE SELECT signals that define the profile followed by said carriage as said carriage is shuttled over said short distance; and, (ii) sweep pulses at a predetermined rate; and, a sweep profile select subsystem, connected to said master controller to receive said SWEEP PROFILE SELECT signals and said sweep pulses, for producing said commanded position signals such that the profile of a commanded position signal is defined by said SWEEP PROFILE SELECT signals and the rate of change of said commanded position signal is determined by said sweep pulse rate.

15. A linear motor shuttling system as claimed in claim 14 wherein said sweep profile select subsystem comprises:

a latch for receiving and storing said SWEEP PROFILE SELECT signals;

a counter for receiving and counting said sweep pulses; and memory means for storing said commanded position signals, said memory including an address input connecting the outputs of said latch and said counter such that the instantaneous output of said memory is determined by the combination of the signal stored in said latch and the state of said counter.

16. A linear motor shuttling system as claimed in claim 15 wherein said memory means includes:

a read only memory whose address inputs are connected to the outputs of said latch and said counter; and, a digital-to-analog converter connected to the signal output of said read only memory.

* * * * *